United States Patent
Kamalaksha et al.

(10) Patent No.: US 10,521,405 B2
(45) Date of Patent: Dec. 31, 2019

(54) POLICY AND CONFIGURATION DATA FOR A USER DIRECTORY

(71) Applicant: HEWLETT PACKARD ENTERPRISE DEVELOPMENT LP, Houston, TX (US)

(72) Inventors: Venkataraman Kamalaksha, Bangalore (IN); Shruti Doval, Bangalore (IN); Rajat Verma, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 66 days.

(21) Appl. No.: 15/522,668

(22) PCT Filed: Apr. 24, 2015

(86) PCT No.: PCT/US2015/027422
§ 371 (c)(1),
(2) Date: Apr. 27, 2017

(87) PCT Pub. No.: WO2016/073030
PCT Pub. Date: May 12, 2016

(65) Prior Publication Data
US 2017/0316032 A1    Nov. 2, 2017

(30) Foreign Application Priority Data
Nov. 3, 2014   (IN) .............................. 5491/CHE/2014

(51) Int. Cl.
*G06F 16/00*   (2019.01)
*G06F 16/185*  (2019.01)
*G06F 16/11*   (2019.01)

(52) U.S. Cl.
CPC .......... *G06F 16/185* (2019.01); *G06F 16/122* (2019.01)

(58) Field of Classification Search
CPC ......... G06F 17/30221; G06F 17/30082; G06F 17/30371; G06F 17/30952; G06F 16/185;
(Continued)

(56) References Cited

U.S. PATENT DOCUMENTS 6,965,924 B1 * 11/2005 Gerthe .................... H04L 67/28
709/218
7,035,857 B2 * 4/2006 Reeves ................. H04L 41/082
(Continued)

FOREIGN PATENT DOCUMENTS

WO    WO-2010050944 A1    5/2010

OTHER PUBLICATIONS

International Search Report and Written Opinion received for PCT Patent Application No. PCT/US2015/027422, dated Jul. 31, 2015, 8 pages.
(Continued)

*Primary Examiner* — Merilyn P Nguyen
(74) *Attorney, Agent, or Firm* — Hewlett Packard Enterprise Patent Department

(57) ABSTRACT

In one example, a system is described in which a storage device, communicatively coupled to a processor, includes a file system management module. This file system management module may create a hierarchical organization directory that is a device and an operating system independent under a root directory in a namespace of a file system. Further, the file system management module may create a user directory under the hierarchical organization directory. Furthermore, the file system management module may create policy and configuration data for the user directory. In addition, the file system management module may store the
(Continued)

policy and configuration data created for the user directory in the hierarchical organization directory.

14 Claims, 6 Drawing Sheets

(58) Field of Classification Search
CPC .. G06F 16/122; G06F 16/907; G06F 11/0727; G06F 11/0751; G06F 11/1458; G06F 16/10; G06F 16/2365; G06F 16/9017; G06F 16/90335
See application file for complete search history.

(56) References Cited

U.S. PATENT DOCUMENTS

| | | | |
|---|---|---|---|
| 7,177,935 B2 | 2/2007 | Bradshaw et al. | |
| 7,240,114 B2 | 7/2007 | Karamanolis et al. | |
| 7,430,570 B1 | 9/2008 | Srinivasan et al. | |
| 7,496,565 B2 | 2/2009 | Thind et al. | |
| 7,610,307 B2 | 10/2009 | Havewala et al. | |
| 7,650,341 B1 | 1/2010 | Oratovsky et al. | |
| 7,739,240 B2 | 6/2010 | Saito et al. | |
| 8,006,056 B2 | 8/2011 | Voigt et al. | |
| 8,099,758 B2 | 1/2012 | Schaefer et al. | |
| 8,103,639 B1 | 1/2012 | Srinivasan et al. | |
| 8,180,813 B1* | 5/2012 | Goodson | G06F 16/907 707/827 |
| 8,311,980 B2 | 11/2012 | Saito et al. | |
| 8,671,108 B2 | 3/2014 | Kondasani | |
| 8,751,547 B2 | 6/2014 | Cross et al. | |
| 9,471,595 B1 | 10/2016 | Vempati et al. | |
| 9,852,149 B1* | 12/2017 | Taylor | G06F 16/1844 |
| 2002/0049782 A1 | 4/2002 | Herzenberg et al. | |
| 2004/0204949 A1 | 10/2004 | Shaji et al. | |
| 2005/0055380 A1* | 3/2005 | Thompson | G06F 16/20 |
| 2006/0259949 A1 | 11/2006 | Schaefer et al. | |
| 2006/0271577 A1 | 11/2006 | Lin | |
| 2006/0282471 A1 | 12/2006 | Mark et al. | |
| 2007/0112789 A1 | 5/2007 | Harvey et al. | |
| 2007/0112790 A1 | 5/2007 | Harvey et al. | |
| 2007/0143292 A1 | 6/2007 | Nozaki et al. | |
| 2008/0294704 A1 | 11/2008 | Akagawa et al. | |
| 2008/0320055 A1 | 12/2008 | Sagar et al. | |
| 2009/0019533 A1* | 1/2009 | Hazlewood | H04L 63/083 726/5 |
| 2009/0178106 A1* | 7/2009 | Feng | H04L 63/083 726/1 |
| 2010/0138922 A1 | 6/2010 | Zaifman et al. | |
| 2010/0281083 A1 | 11/2010 | Purtell et al. | |
| 2012/0036161 A1 | 2/2012 | Lacapra et al. | |
| 2012/0117035 A1 | 5/2012 | Ranade et al. | |
| 2012/0158652 A1 | 6/2012 | Ps et al. | |
| 2013/0282668 A1 | 10/2013 | Hsieh | |
| 2013/0325817 A1 | 12/2013 | Whitehouse | |
| 2014/0006465 A1* | 1/2014 | Davis | G06F 17/30194 707/827 |
| 2014/0007239 A1* | 1/2014 | Sharpe | G06F 21/561 726/24 |
| 2014/0351388 A1* | 11/2014 | Srinivasan | G06F 16/13 709/219 |

OTHER PUBLICATIONS

International Search Report and Written Opinion received for PCT Patent Application No. PCT/US2015/027419, dated Jul. 29, 2015, 8 pages.
International Preliminary Report on Patentability received for PCT Patent Application No. PCT/US2015/027422, dated May 18, 2017, 7 pages.
International Preliminary Report on Patentability received for PCT Patent Application No. PCT/US2015/027419, dated May 18, 2017, 7 pages.
Gunaini, H.S. et al., "Improving File System Reliability with I/O Shepherding," (Research Paper), Oct. 14-17, 2007, 14 pages, http://www.sosp2007.org/papers/sosp068-gunawi.pdf.
Kamalaksha, V., "Policy and Configuration Data for a User Directory", 5491/CHE/2014, Nov. 3, 2014, 32 pages.
Lu, Y. et al., "ReconFS: A Reconstructable File System on Flash Storage," (Research Paper), Feb. 17-20, 2014, 15 pages, https://www.usenix.org/system/files/conference/fast14/fast14-paper_lu.pdf.
McKusick, MK et al., "Fsck—The UNIX File System Check Program," (Research Paper), Oct. 7, 1996, UNIX vol. II, pp. 581-592.
Oracle Corporation, "What fsck Checks and Tries to Repair," (Research Paper), 5 pages, http://docs.oracle.com/cd/E19455-01/805-7228/6j6q7ufOe/index.html.

* cited by examiner

POLICY AND CONFIGURATION DATA FOR A USER DIRECTORY

BACKGROUND

A file system can be used to store data in files and organize the files into hierarchical directories. A file system may define policy and configuration data.

BRIEF DESCRIPTION OF THE DRAWINGS

Examples of the disclosure are now be described in detail with reference to the accompanying drawings, in which.

DETAILED DESCRIPTION

Figure 1:
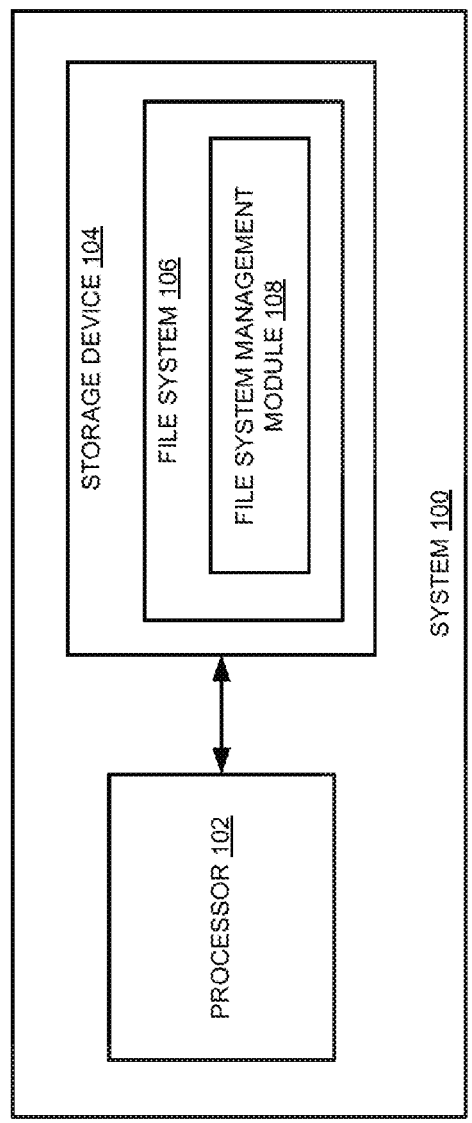
FIG. 1 is a block diagram of an example system for creating a policy and configuration data storage, infrastructure for a file system.

In the following detailed description of the examples of the present subject mailer, references are made to the accompanying drawings that form a part hereof, and in which are shown by way of illustration specific in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Examples described herein provide enhanced methods, techniques, and systems for creating a policy and configuration data storage infrastructure for a file system. A file system can be used to store data in files and organize the files into hierarchical directories. A file system may include a directory that define policy and configuration data and the defined policy and configuration data may appear as default policy and configuration data on each sub-directory under the directory. Further, each sub-directory may also define policy and configuration data that is applicable for files in the sub-directory. Existing methods may provide a hierarchical database, external to the file system, for storing the policy and configuration data associated with each directory or sub-directory in the file system. In an example, an application accessing a file in a sub-directory may be allowed to retrieve the policy and configuration data associated with the file from the hierarchical database. However, the application may not be able to know an uppermost level of the sub-directory under which the file exists, so that related policy and configuration data can be retrieved. Further, the application may not be able to retrieve the policy and configuration data from the hierarchical database when the application is running on different operating system (OS) or computing device.

To address these issues, the present disclosure describes various examples for creating a policy and configuration data storage infrastructure for a file system. In an example, a hierarchical organization directory that is a device (e.g., a computing device and so on) and OS independent is created under a root directory in a namespace of the file system. Further, a user directory is created under the hierarchical organization directory. Furthermore, policy and configuration data are created for the user directory. In addition, the policy and configuration data created for the user directory is stored in the hierarchical organization directory.

The example implementations mentioned herein provide the policy and configuration data storage infrastructure where policy (hierarchical name and value pairs) and configuration data can be specified for entire file system or associated with portions of the namespace of the file system. The "name" is a policy name and "value" is policy applicable. Example policy includes an authentication policy, a fallback policy, an allocation or a storage policy, a default retention time policy, a resolution policy, and so on. Example configuration includes policies in the form of binary data. The policy and configuration data is stored in the file system and hence available on any device where the file system is made available. Further, the example implementations provide an inheritance model for the policy data. Thus allowing a single instance of an application to serve multiple directories as per the customizations. Furthermore, applications may able to infer the policy and configuration data to be applied to a given file in the file system. Also, the policy and configuration data storage infrastructure provides reliability by ensuring that modifications are durable and provides transactional semantics by assuring that a modification is taken in its entirety or none at all.

FIG. 1 is a block diagram of an example system 100 for creating a policy and configuration data storage infrastructure for a file system. The system 100 may represent any type of computing device capable of reading machine-executable instructions. Examples of computing device may include, without limitation, a server, a desktop computer, a notebook computer, a tablet computer, a thin client, a mobile device, a personal digital assistant (PDA), a phablet, and the like.

In the example illustrated in FIG. 1, the system 100 may include a processor 102 and a storage device 104 communicatively coupled to the processor 102. In an example, she storage device 104 may be machine readable storage medium (e.g. a disk drive). The machine-readable storage medium may also be an external medium that may be accessible to the system 100. Further, the storage device 104 includes a file system 106 having a file system management module 108. For example, the file system management module 108 may refer to machine executable instructions, hardware components or a combination thereof. The file system management module 108 may include, by way of example, components, such as processes, tasks, co-routines, functions, attributes, procedures, drivers, data, databases, data structures and application specific integrated circuits (ASIC). The file system management module 108 may reside on a volatile or non-volatile storage medium and configured to interact with a processor 102 of the system 100.

Figure 3:
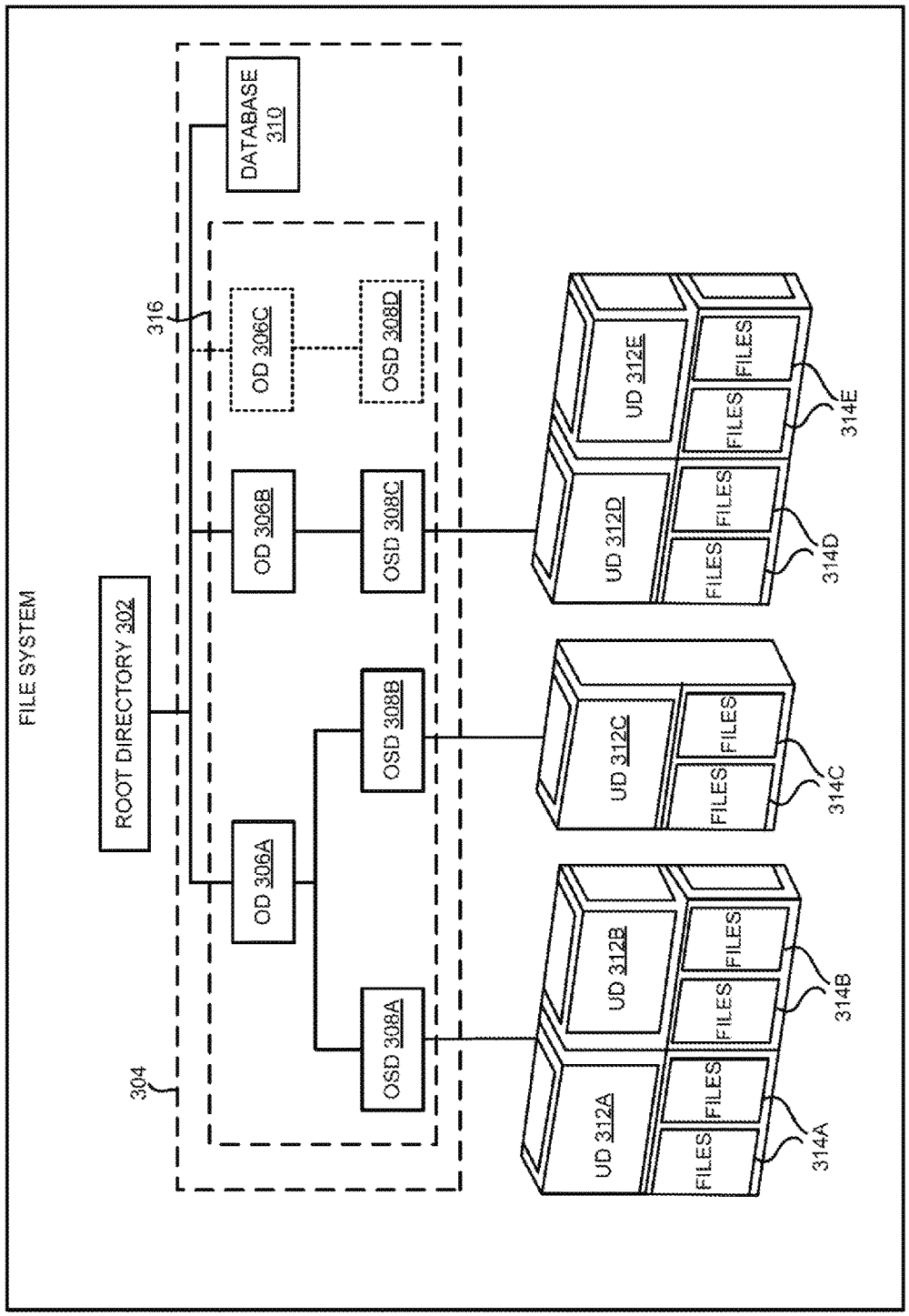
FIG. 3 is a block diagram of an example file system, such as shown in FIGS. 1 and 2.

In operation, the file system management module 108 creates a hierarchical organization directory (e.g., a hierarchical organization directory 316 shown in FIG. 3) that is a device and OS independent under a root directory in a namespace of the file system 106. In an example, the hierarchical organization directory may include organization directories and organization sub-directories under each organization directory (e.g., organization directories (ODs) 306A and 306B and organization sub-directories (OSDs) 308A-C shown in FIG. 3). In another example, the hierarchical organization directory may include first organization directories, second organization directories under each first organization directory and organization sub-directories under each second organization directory. Further, the file system management module 108 creates a user directory under the hierarchical organization directory. More particularly, the file system management module 108 creates a user directory (e.g., one of user directories (UDs) 312A-E shown in FIG. 3) under an associated organization sub-directory. Thus creating a policy and configuration data storage infrastructure for the file system 106. An example file system including a hierarchical organization directory between a root directory and user directories is shown in FIG. 3. The file system management module 108 may then create policy and configuration data for the user directory on the hierarchical organization directory. In other words, the file system management module 108 may create the policy and configuration data that is applicable to the user directory on the hierarchical organization director. In addition, the file system management module 108 stores the policy and configuration data created for the user directory in the hierarchical organization directory.

In some examples, the file system management module 108 creates a database (e.g., a database 310 shown in FIG. 3) under the root directory to store information associated with the hierarchical organization directory. The information may include identification numbers associated with the organization directories and organization sub-directories in the hierarchical organization directory, a hierarchy associated with the organization directories and organization sub-directories in the hierarchical organization directory, and contents associated with the policy and configuration data. In some example implementations, the file system management module 108 may retrieve and modify (e.g., add or delete) the organization directories and organization sub-directories and the contents of the associated policy and configuration data. The file system management module 108 can also list hierarchical organization objects in the file system. The hierarchical organization objects may include the organization directories, the organization sub-directories and/or files within the hierarchical organization directory. This is explained in more detail with reference to FIG. 2.

Figure 2:
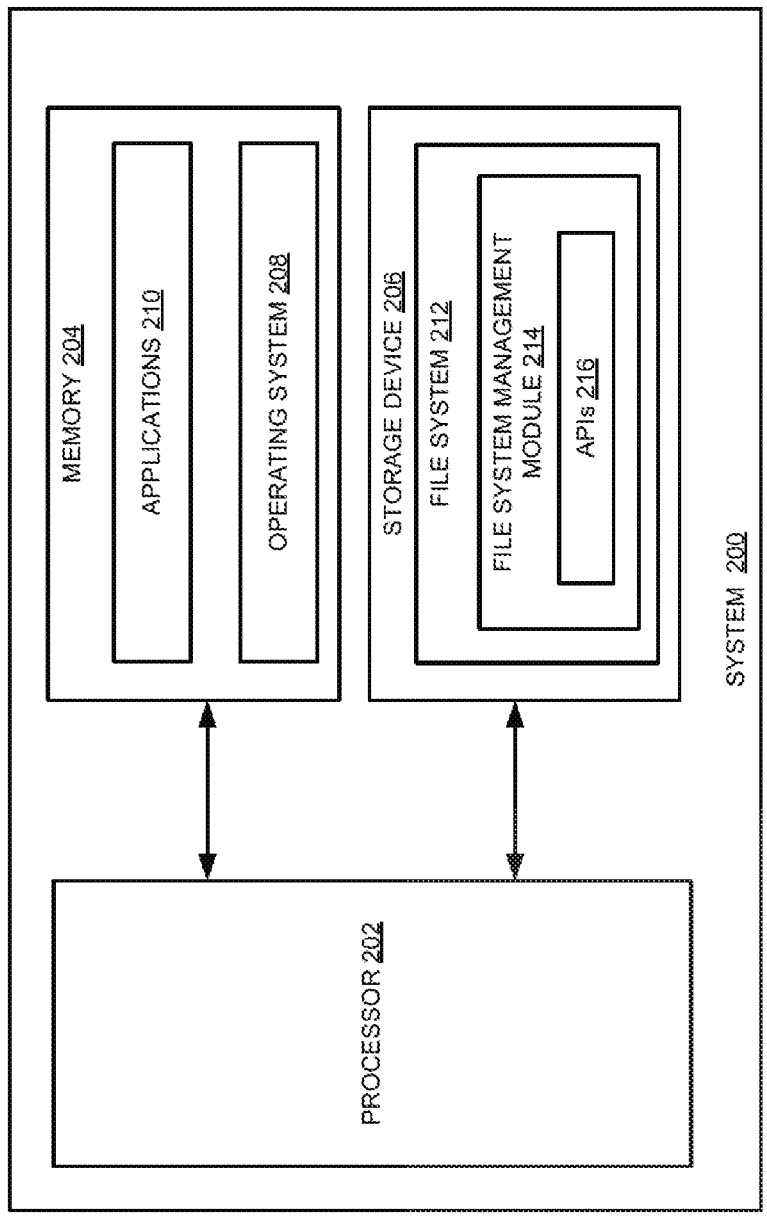
FIG. 2 is a block diagram of another example system for creating a policy and configuration data storage infrastructure for a file system.

FIG. 2 is a block diagram of another example system 200 for creating a policy and configuration data storage infrastructure for a file system. In the example illustrated in FIG. 2, the system 200, which is similar to the system 100, may include a processor 202, a memory 204 communicatively coupled to the processor 202 and a storage device 206 communicatively coupled to the processor 202. In an example, the storage device 206 may be machine readable storage medium (e.g., a disk drive). The machine-readable storage medium may also be an external medium that may be accessible to the system 200. Further, OS 208 and applications 210 running on the OS 208 may reside in the memory 204. Furthermore, the storage device 206 may include a file system 212 including a file management module 214 and application programming interfaces (APIs) 216 in the file management module 214. The APIs 216 may be provided, by the file system management module 214, for the applications 210 to create the policy and configuration data storage infrastructure (i.e., organization directories and organization sub-directories) for the file system 212 and manage the file system 212 (i.e., add, delete, modify, copy or list the organization directories and organization sub-directories and associated policy and configuration data). Example APIs 216 may include remote procedure call (RPC) interfaces and so on.

In operation, the file management module 214 creates one or more organization directories (e.g., ODs 306A and 306B shown in FIG. 3) under a root directory in a namespace of She file system 212. Further, the file management module 214 creates one or more organization sub-directories (e.g., QSDs 308A-C shown in FIG. 3) under each of the organization directories. Each of the organization directories and organization sub-directories can be uniquely identified by an unique path (e.g., /organization directory1/organization sub-directory1) or by an unique identification number. The unique identification number may be stored in an index node (inode) of the associated directory. An inode is a data structure used to represent directories in the file system. For example, the identification number is kept monotonically increasing to ensure that there are no collisions. In an example, when the file system is mounted, a file that stores the organization directories and sub-directories is read to find a highest identification number assigned and incremented to ensure continuity across file system mount/unmounts.

Furthermore, the file management module 214 creates one or more user directories (e.g., UDs 312A-E shown in FIG. 3) under each of the organization sub-directories. For example, an organization directory can be a directory associated with an organization, an organization sub-directory can be a department within the organization and a user directory can be a directory associated with a user within the department in the organization. In the example illustrated in FIG. 2, the file management module 214 may place flags on an on disk directory entry and inode of the organization directory and organization sub-directory to ensure that operations permitted to the user directories may not be allowed. Further, the file management module 214 may place the unique identification number of the organization directory or organization sub-directory in an mode of each associated object (e.g., the user directories or files).

In addition, the file management module 214 may create policy and configuration data for each user directory or all user directories or some of the user directories and may store the policy and configuration data in the associated organization directories or organization sub-directories. In other words, the file management module 214 may create and store policy and configuration data that is applicable to some or all user directories on an organization directory or an organization sub-directory. For example, the policy and configuration data on an organization directory may appear on objects (organization sub-directories, user directories or files) under the organization directory as "inherited policy and configuration data".

In an example implementation, the file management module 214 may create a default organization directory (e.g., an OD 306C shown in FIG. 3) under the root directory and a default organization sub-directory (e.g., an OSD 308D shown in FIG. 3) under the default organization directory, when the file system 212 is created. The default organization directory is created for storing policy and configuration data that is applicable to all organization directories in the file system 212. In other words, the policy and configuration data specified on the default organization directory appears on all organization directories as "inherited policy and configuration data". In the example illustrated in FIG. 2, the file management module 214 may place flags on an on-disk directory entry and inode of the default organization directory and default organization sub-directory to ensure that normal operations permitted to the user directories may not be allowed.

In some examples, the file system management module 214 creates a database (e.g., a database 310 shown in FIG. 3) under the root directory which includes information of hierarchical organization objects (organization directories and organization sub-directories) and associated policy and configuration data. For example, the unique identification numbers and the hierarchy of the organization directories and organization sub-directories are recorded in a the under the database. The file is used as an authentic source of information about the hierarchy and can be recreated. Further, for each policy hive (e.g., a group of policies) that includes a set of name and value pairs, a file is kept in the database. The name of the file may be constructed such that the file name includes both the directory to which the hive belongs and a name of the hive. For example, if there is an organization directory by name of Tenant1 with an identification number of 1 and a hive called "SomePolicyHive" is created, then the file name may be "tenant1_1_SomePolicyHive". Thus allowing to easily locate all the hives that belong to the organization directory. The content of the file may have the list of all name and value pairs arranged in variable-length records format. Furthermore, for each configuration, a file is kept in the database. The file name may be constructed such that the file name includes both the directory to which the configuration belongs and the name of the configuration. For example, if there is an organization object by name of Tenant2 with an identification number of 2 and the configuration data called "SomeConfig" is created, then the file name may be "tenant2_2_SomeConfig". The content of the file may be the contents of the configuration.

In the example illustrated in FIG. 2, the file system management module 214, via the APIs 216, may create, modify, copy, list and retrieve the organization directories and organization sub-directories and associated policy and configuration data upon receiving requests from the applications 210. The file system management module 214 may create, modify, and retrieve metadata related to organization directories and organization sub-directories via the APIs 216 upon receiving requests from the applications 210. In one example, the file system management module 214 may modify an organization directory or sub-directory hierarchy or the policy and configuration data via one of the APIs 216 by:

a. creating a copy of a file, including the organization directory or sub-directory hierarchy or the policy and configuration data, in the database, b. updating the copy with a change specified (e.g., a new organization directory, a new organization sub-directory etc.) and generating an unique identification number.

c. creating a new directory marked with flags and an unique identification number in the file system, and e. renaming and storing the updated copy in the database.

In another example, the file system management module 214 may list all the organization directory and organization sub-directory objects from a file maintained in the database via one of the APIs 216. In yet another example, the file system management module 214 may retrieve the contents of a name and value pair in a policy hive via one of the APIs 216. This is explained in more detailed with reference to FIG. 5. In one example, the file system management module 214 may retrieve the contents of a configuration, via one of the APIs 216, by locating a configuration data file in the database and retrieving the contents (number of bytes) from the file. In another example, the file system management module 214 may make changes, via one of the APIs 216, to the organization directory or organization sub-directory hierarchy or associated policy and configuration data in an atomic manner i.e., all operations to carry out the change are done or none at all.

FIG. 3 is a block diagram of an example file system 300, such as shown in FIGS. 1 and 2. The file system 300 may be created on one or more segments of a storage device. As shown in FIG. 3, the file system 300 may include ODs 306A and 306B and a default OD 306C under a root directory 302. Further, the file system 300 include QSDs 308A and 308B under the OD 306A, an OSD 308C under the OD 306B and a default OSD 308D under the default OD 306C. Each of the ODs 306A-C or OSDs 308A-D can be uniquely identified by a unique path or by an identification number. The OSD 308A-D can span across segments and each segment can be hosted by one of computing nodes (e.g. the system 100 of FIG. 1 or system 200 of FIG. 2) that serve the file system 300. The OSDs 308A-D may be visible to end users as a file share over protocols. As shown in FIG. 3, UDs 312A-E including files 314A-E are created under the associated OSDs 308A-C. When more storage is added, the storage may be carved into segments and is made to be part of the OSDs 308A-D of the file system 300. When additional computing nodes are added for more processing power, storage on the additional computing nodes may be carved out into segments and assigned to the OSDs 308A-D of the file system 300 and the file system 300 may be exported over the protocols. In addition to adding capacity, new ODs or OSDs can be added, ODs 306A-C or OSDs 308A-D can be deleted and the ODs 306A-C or OSDs 308A-D and associated policy and configuration data can be replicated onto other segments.

Further, policy and configuration data can be created and stored on the ODs 306A-C and OSDs 308A-D. The policy and configuration data can be same on the ODs 306A and 306B and OSDs 308A-C or can be different on each or some of the ODs 306A and 306B and OSDs 308A-C. In an example, the OD 306C may include policy and configuration data that is applicable to the ODs 306A and 306B and the OSD 306D may include policy and configuration data that is applicable to the OSDs 308A-C. For example, the ODs 306A-C may store policy and configuration data associated with authentication and the OSDs 308A-D may store policy and configuration data associated with storage allocation. Example policy data includes hierarchical name and value pairs. The "name" is a policy name and "value" is the policy applicable. In an example implementation, the policy and configuration data created on the ODs 306A-C or OSDs 308A-D can be stored in a database 310 under the root directory 302. Thus, a policy and configuration data storage infrastructure 304 is created for the file system 300. Furthermore, the policy and configuration data can be retrieved or modified. In some examples, policy data may be stored, retrieved and modified as metadata when a value of the policy is larger than 64 KB.

Figure 4:
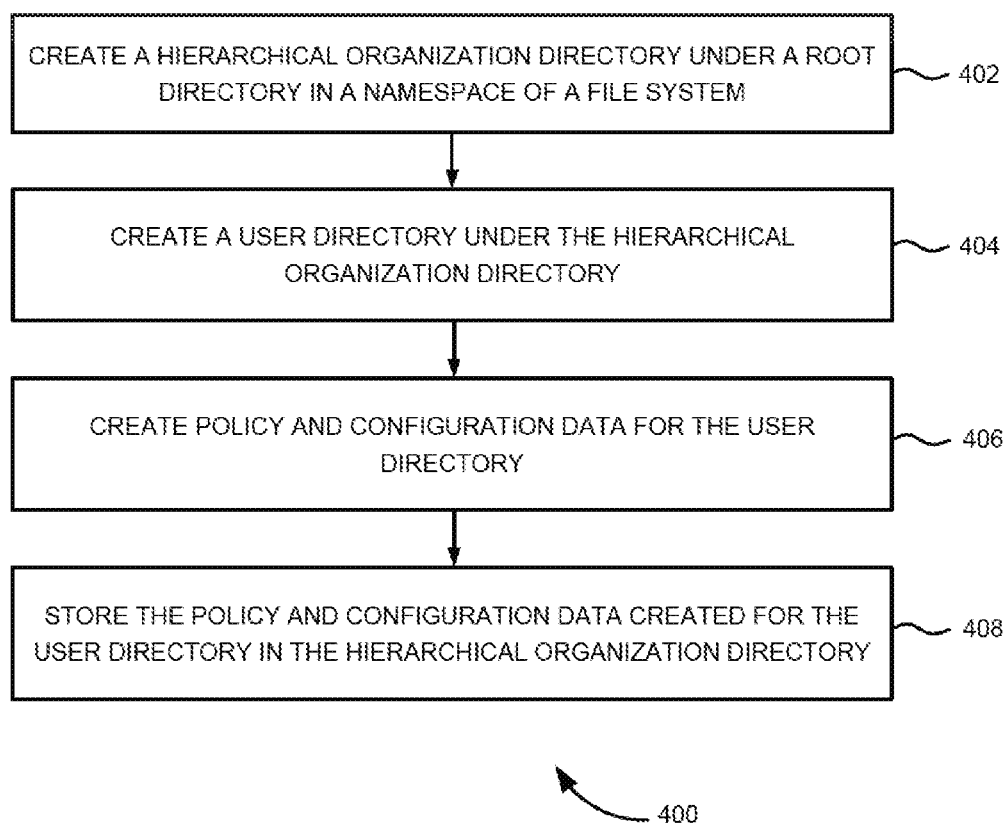
FIG. 4 is a flow chart of an example method for creating a policy and configuration data storage infrastructure for a file system.

FIG. 4 is a flow chart of an example method 400 for creating a policy and configuration data storage infrastructure for a file system. The method 400, which is described below, may be executed on a system 100 of FIG. 1 or system 200 of FIG. 2. However, other systems may be used as well. At block 402, a hierarchical organization directory that is a device and OS independent may be created under a root directory in a namespace of a file system. For example, the hierarchical organization directory includes an organization directory and an organization sub-directory under the organization directory. Each of the organization directory and the organization sub-directory may be identified using an associated unique identification number. In an example, default policy and configuration data associated with the hierarchical organization directory may be created upon creating the hierarchical organization directory. Further, a database may be created under the root directory upon creating the hierarchical organization directory to store information associated with the hierarchical organization directory. The information may include an identification number associated with the hierarchical organization directory and contents associated with the policy and configuration data in the hierarchical organization directory.

At block 404, a user directory may be created under the hierarchical organization directory. In other words, the user directory may be created under the organization sub-directory and includes the unique identification number of the organization sub-directory. At block 406, policy and configuration data for the user directory may be created. At block 408, the policy and configuration data created for the user directory may be stored in the hierarchical organization directory. In one example, new policy and configuration data for the user directory is created and stored in the hierarchical organization directory when a request is received from a user or an application. The application may be running on OS or may be invoked to run on the user directory.

In some examples, policy and configuration data related to the user directory is retrieved from the hierarchical organization directory when a request is received from an application running on OS. The application may be running on the OS to determine the policy and configuration data related to the user directory. For example, the policy and configuration data related to the user directory may include the default policy and configuration data associated with the hierarchical organization directory, the policy and configuration data created for the user directory and/or the new policy and configuration data created for the user directory.

In an example, the database is updated to include the policy and configuration data and/or the new policy and configuration data created for the user directory as and when they are created. The hierarchical organization directory and the policy and configuration data can be modified using files in the database. The contents associated with the policy and configuration data can be retrieved using files in the database. This is explained in more detail with reference to FIG. 5. Hierarchical organization objects in the file system can be listed using the database. The objects may include the hierarchical organization directory and/or files within the hierarchical organization directory. The process of creating the policy and configuration data storage infrastructure for the file system is explained in more detail with reference to FIGS. 1-3.

Figure 5:
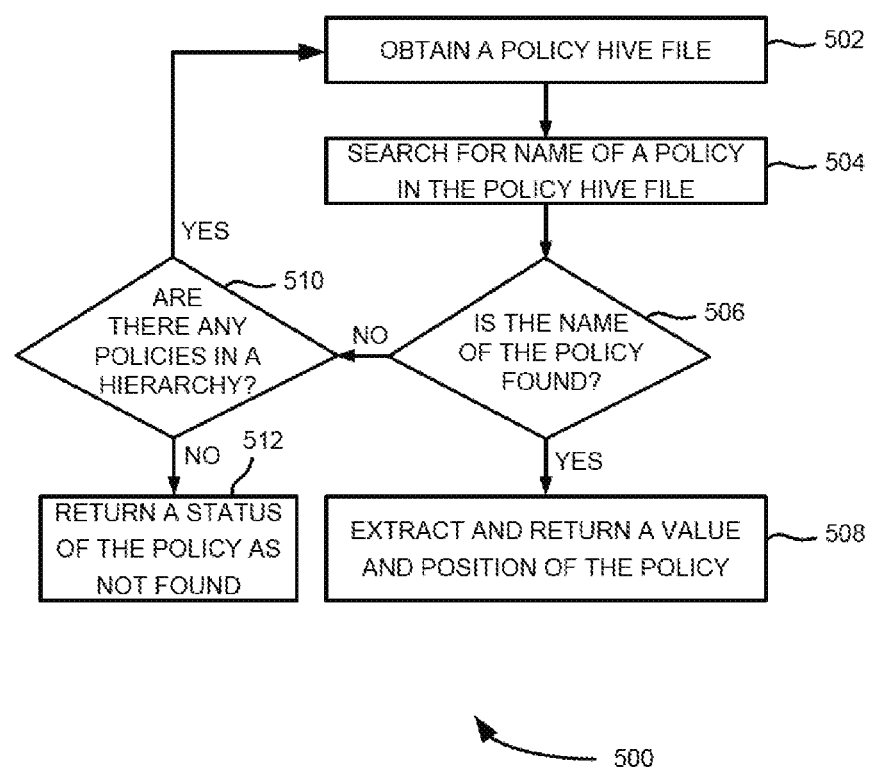
FIG. 5 is a flow chart of an example method for looking up a policy on an organization directory or an organization sub-directory in a file system.

FIG. 5 is a flow chart of an example method 500 for looking up a policy on an organization directory or organization sub-directory in a file system. At block 502, a policy hive file is obtained from a database (e.g., a database 310 shown in FIG. 3). At block 504, a name of the policy is searched in the policy hive file. At block 506, a check is made to determine whether the name of policy is found in the policy hive file. If the name of policy is found in the policy hive file, extract and return a value and position of the policy at block 508. The policy is then marked as inherited policy. If the name of policy is not found in the policy hive file, a check is made to determine whether there are any policies in a hierarchy at block 510. In other words, if the name of policy is not found in the policy hive file, associated parent object identification number is obtained from an inode. If there are policies in the hierarchy, the process steps from block 502 are repeated. If there are no policies in the hierarchy, return a status of the policy a s not found at block 512.

Figure 6:
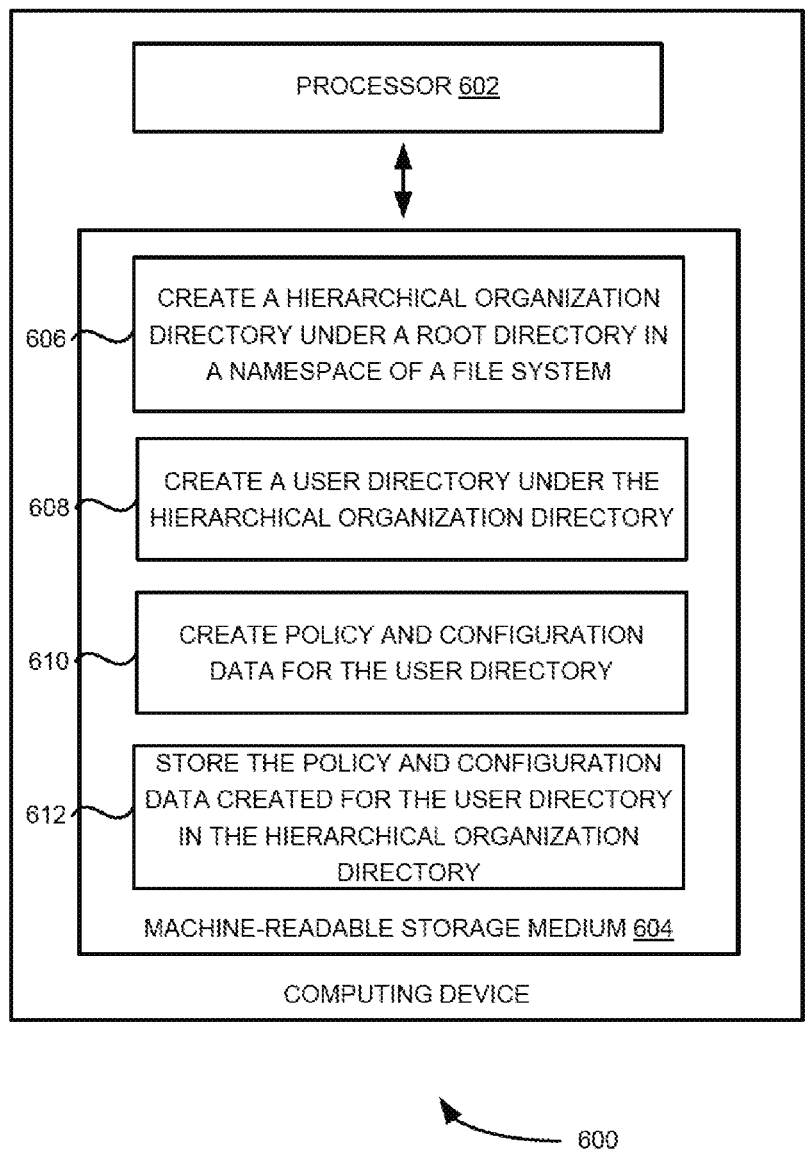
FIG. 6 is a block diagram of an example computing device for creating a policy and configuration data storage infrastructure for a file system.

FIG. 6 is a block diagram of an example computing device 600 for creating policy and configuration data storage infrastructure for a file system. The computing device 600 includes a processor 602 and a machine-readable storage medium 604 communicatively coupled through a system bus. The processor 602 may be any type of central processing unit (CPU), microprocessor, or processing logic that interprets and executes machine-readable instructions stored in the machine-readable storage medium 604. The machine-readable storage medium 604 may be a random access memory (RAM) or another type of dynamic storage device that may store information and machine-readable instructions that may be executed by the processor 602. For example, the machine-readable storage medium 604 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, the machine-readable storage medium 604 may be a non-transitory machine-readable storage medium. In an example, the machine-readable storage medium 604 may be remote but accessible to the computing device 600.

The machine-readable storage medium 604 may store instructions 606, 608, 610, and 612. In an example, instructions 606 may be executed by processor 602 to create a hierarchical organization directory that is a device and OS independent under a root directory in a namespace of a file system. Instructions 608 may be executed by processor 602 to create a user directory under the hierarchical organization directory. Instructions 610 may be executed by processor 602 to create policy and configuration data for the user directory. Instructions 612 may be executed by processor 602 to store the policy and configuration data created for the user directory in the hierarchical organization directory.

For the purpose of simplicity of explanation, the example method of FIG. 4 is shown as executing serially, however it is to be understood and appreciated that the present and other examples are not limited by the illustrated order. The example systems of FIGS. 1, 2 and 6, and methods of FIGS. 4 and 5 may be implemented in the form of a computer program product including computer-executable instructions, such as program code, which may be run on any suitable computing device in conjunction with a suitable OS. Examples within the scope of the present disclosure may also include program products comprising non-transitory computer-readable storage media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present disclosure is for the purpose of illustration. Although the disclosure has been described in conjunction with a specific example thereof, numerous modifications may be possible without materially departing from the teachings and advantages of the subject matter described herein. Other substitutions, modifications and changes may be made without departing from the spirit of the present disclosure. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A system comprising:
   a processor; and
   a non-transitory storage device communicatively coupled to the processor, wherein the non-transitory storage device comprises instructions executable by the processor to:
   create a hierarchical organization directory that is device and operating system independent under a root directory in a namespace of a file system;
   create default policy and configuration data associated with the hierarchical organization directory;
   create a user directory under the hierarchical organization directory;
   create policy and configuration data for the user directory;
   store the policy and configuration data created for the user directory in the hierarchical organization directory; and
   receive a request to retrieve policy and configuration data related to the user directory from an application running on an operating system and retrieve the policy and configuration data related to the user directory from the hierarchical organization directory, wherein the policy and configuration data related to the user directory comprises the default policy and configuration data associated with the hierarchical organization directory and the policy and configuration data created for the user directory.

2. The system of claim 1, wherein the non-transitory storage device further comprises instructions executable by the processor to:
   receive a request to create and store new policy and configuration data for the user directory from the application running on the operating system; and
   create and store the new policy and configuration data for the user directory in the hierarchical organization directory.

3. The system of claim 1, wherein the non-transitory storage device further comprises instructions executable by the processor to create a database under the root directory to store information associated with the hierarchical organization directory, wherein the information comprises an identification number and a hierarchy associated with the hierarchical organization directory and contents associated with the policy and configuration data in the hierarchical organization directory.

4. The system of claim 3, wherein the non-transitory storage device further comprises instructions executable by the processor to perform at least one of:
   modify the hierarchical organization directory, the hierarchy and the policy and configuration data;
   retrieve the contents associated with the policy and configuration data in the hierarchical organization directory; and
   list hierarchical organization objects in the file system, wherein the hierarchical organization objects comprise the hierarchical organization directory and/or files within the hierarchical organization directory.

5. The system of claim 1, wherein the hierarchical organization directory comprises an organization directory and an organization sub-directory under the organization directory, wherein each of the organization directory and the organization sub-directory is identified using an associated unique identification number and wherein the user directory comprises the unique identification number of the organization sub-directory.

6. A method comprising:
   creating a hierarchical organization directory that is device and operating system independent under a root directory in a namespace of a file system;
   creating default policy and configuration data associated with the hierarchical organization directory;
   creating a user directory under the hierarchical organization directory;
   creating policy and configuration data for the user directory;
   storing the policy and configuration data created for the user directory in the hierarchical organization directory; and
   retrieving policy and configuration data related to the user directory from the hierarchical organization directory when a request is received from an application running on an operating system, wherein the policy and configuration data related to the user directory comprises the default policy and configuration data associated with the hierarchical organization directory and the policy and configuration data created for the user directory.

7. The method of claim 6, further comprising:
   creating and storing new policy and configuration data for the user directory in the hierarchical organization directory when a request is received from the application running on the operating system.

8. The method of claim 6, wherein the hierarchical organization directory comprises an organization directory and an organization sub-directory under the organization directory, wherein each of the organization directory and the organization sub-directory is identified using an associated unique identification number and wherein the user directory comprises the unique identification number of the organization sub-directory.

9. The method of claim 6, further comprising:
   creating a database under the root directory to store information associated with the hierarchical organization directory, wherein the information comprises an identification number and a hierarchy associated with the hierarchical organization directory and contents associated with the policy and configuration data in the hierarchical organization directory.

10. The method of claim 9, further comprising perform at least one of:
    modifying the hierarchical organization directory, the hierarchy and the policy and configuration data;
    retrieving the contents associated with the policy and configuration data in the hierarchical organization directory; and
    listing hierarchical organization objects in the file system, wherein the hierarchical organization objects comprise the hierarchical organization directory and/or files within the hierarchical organization directory.

11. A non-transitory machine-readable storage medium comprising instructions executable by a processor to:
- create a hierarchical organization directory that is device and operating system independent under a root directory in a namespace of the file system;
- create default policy and configuration data associated with the hierarchical organization directory;
- create a user directory under the hierarchical organization directory;
- create policy and configuration data for the user directory;
- store the policy and configuration data created for the user directory in the hierarchical organization directory; and
- receive a request to retrieve policy and configuration data related to the user directory from an application running on an operating system and retrieve the policy and configuration data related to the user directory from the hierarchical organization directory, wherein the policy and configuration data related to the user directory comprises the default policy and configuration data associated with the hierarchical organization directory and the policy and configuration data created for the user directory.

12. The non-transitory machine-readable storage medium of claim 11, wherein the hierarchical organization directory comprises an organization directory and an organization sub-directory under the organization directory, wherein each of the organization directory and the organization sub-directory is identified using an associated unique identification number and wherein the user directory comprises the unique identification number of the organization sub-directory.

13. The non-transitory machine-readable storage medium of claim 11, further comprising additional instructions executable by the processor to:
- receive a request to create and store new policy and configuration data for the user directory from the application running on the operating system; and
- create and store the new policy and configuration data for the user directory in the hierarchical organization directory.

14. The non-transitory machine-readable storage medium of claim 11, further comprising additional instructions executable by the processor to:
- create a database under the root directory to store information associated with the hierarchical organization directory, wherein the information comprises an identification number and a hierarchy associated with the hierarchical organization directory and contents associated with the policy and configuration data in the hierarchical organization directory.

* * * * *